US006087406A

United States Patent [19]
Worm et al.

[11] Patent Number: 6,087,406
[45] Date of Patent: *Jul. 11, 2000

[54] RECYCLE OF VULCANIZED FLUORINATED ELASTOMERS

[75] Inventors: Allan T. Worm, North St. Paul; Erik D. Hare, St. Paul; Paul N. Nelson, Eagan, all of Minn.

[73] Assignee: Dyneon LLC, Oakdale, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/854,787

[22] Filed: May 12, 1997

Related U.S. Application Data

[60] Provisional application No. 60/036,230, Mar. 12, 1997.

[51] Int. Cl.$^7$ .............................. C08L 27/24; C08F 8/50
[52] U.S. Cl. ...................... 521/41.5; 521/42; 521/42.5; 521/43; 521/44; 521/46; 525/192; 525/194; 525/195; 525/199; 525/326.3; 525/326.4
[58] Field of Search ............................. 525/192, 194, 525/195, 199, 326.4, 326.3; 521/41.5, 42, 42.5, 43, 44, 46

[56] References Cited

U.S. PATENT DOCUMENTS

| | | | |
|---|---|---|---|
| 2,732,398 | 1/1956 | Brice et al. | 260/503 |
| 2,803,656 | 8/1957 | Ahlbrecht et al. | 260/556 |
| 3,655,727 | 4/1972 | Patel et al. | 260/470 P |
| 3,686,143 | 8/1972 | Bowman | 260/47 UP |
| 3,712,877 | 1/1973 | Patel et al. | 260/87.7 |
| 3,752,787 | 8/1973 | de Brunner | 260/41 B |
| 3,857,807 | 12/1974 | Kometani et al. | 260/29.6 F |
| 3,876,654 | 4/1975 | Pattison | 260/30.4 R |
| 3,933,372 | 1/1976 | Herndon | 280/150.5 |
| 4,233,421 | 11/1980 | Worm | 525/343 |
| 4,259,463 | 3/1981 | Moggi et al. | 525/331 |
| 4,296,034 | 10/1981 | Bouvet et al. | 260/326.82 |
| 4,358,559 | 11/1982 | Holcomb et al. | 524/380 |
| 4,535,941 | 8/1985 | Brubaker et al. | 241/21 |
| 4,625,922 | 12/1986 | Brubaker et al. | 241/17 |
| 4,737,547 | 4/1988 | White | 525/193 |
| 4,855,360 | 8/1989 | Duchesne et al. | 525/187 |
| 4,882,390 | 11/1989 | Grootaert et al. | 525/326.3 |
| 5,015,693 | 5/1991 | Duchesne et al. | 525/187 |
| 5,086,123 | 2/1992 | Guenthner et al. | 525/276 |
| 5,262,490 | 11/1993 | Kolb et al. | 525/343 |
| 5,371,143 | 12/1994 | Novak et al. | 525/88 |
| 5,411,215 | 5/1995 | Rouse | 241/21 |
| 5,548,028 | 8/1996 | Tabb | 525/194 |
| 5,585,449 | 12/1996 | Arcella et al. | 526/247 |

FOREIGN PATENT DOCUMENTS

| | | | |
|---|---|---|---|
| 120462A1 | 10/1984 | European Pat. Off. | C08L 27/16 |
| 182299A2 | 5/1986 | European Pat. Off. | C08L 27/16 |
| 0217585A2 | 4/1987 | European Pat. Off. | C08J 5/18 |

OTHER PUBLICATIONS

Grootaert, W. M., Millet, G. H. and Worm, A. T., "Fluorocarbon Elastomers", Kirk–Othmer, Encyclopedia of Chemical Technology, vol. 8, pp. 990–1005, 4th ed., John Wiley & Sons, 1993.

"Encyclopedia of Polymer Science and Engineering," vol. 2, pp. 75–82 and 86–90, John Wiley & Sons, 1985.

Nicholas P.P., Luxeder, A.M., Brooks, L.A., Hommes, P.A., "Antioxidant and Antiozonants", Kirk–Othmer, *Encyclopedia of Chemical Technology*, vol. 3, pp. 128–142, 3rd ed., John Wiley & Sons, 1978.

*Primary Examiner*—Donald R. Wilson
*Attorney, Agent, or Firm*—James V. Lilly

[57] ABSTRACT

Compositions and techniques useful to effectively recycle crosslinked (i.e., vulcanized or cured) fluoroelastomers are disclosed. The invention utilizes an additive system that includes a cure-enhancing additive, a crosslinking agent, and an accelerator.

21 Claims, 1 Drawing Sheet

6,087,406

RECYCLE OF VULCANIZED FLUORINATED ELASTOMERS

This application claims priority from U.S. Provisional Application 60/036,230, filed Mar. 12, 1997.

FIELD OF THE INVENTION

This invention relates to recycling of fluorinated elastomers that have been at least partially vulcanized.

BACKGROUND OF THE INVENTION

Fluorinated elastomeric materials (sometimes referred to hereinafter either as fluorinated elastomers or fluoroelastomers) are synthetic, noncrystalline polymers which are usually vulcanized or cured to enhance their properties for use in a variety of industrial articles, such as molded or shaped parts. See for example Grootaert, W. M., Millet, G. H. and Worm, A. T., "Fluorocarbon Elastomers", Kirk-Othmer, Encyclopedia of Chemical Technology, Vol. 8, pp. 990–1005, 4th ed., John Wiley & Sons, 1993. Typically they are used in the more demanding applications where exposure to extreme heat or harsh chemical or solvent environments is encountered.

Processes used for making molded fluoroelastomer articles, for example O-rings, inherently have a relatively high degree of waste, e.g., 30% or higher. This waste, also commonly called scrap, may include flash, sprue and runners, and out-of specification parts.

It is desirable to reuse (i.e., recycle) this waste material. However, for a variety of reasons, it has been very difficult to do so. For example, the waste material cannot be recycled merely by grinding and reforming as with many thermoplastic polymer operations. Usually such direct addition of the waste material results in a composition having a higher minimum viscosity. This increase in minimum viscosity typically negatively affects later processes, such as injection molding.

It has also been generally observed that the inclusion of waste material in a fluoroelastomer formulation has a negative effect on both the cure rheology and the physical properties of articles made from such formulations. Both are inferior to those demonstrated by formulations, and the resultant articles, that do not contain waste material (i.e., virgin formulations and articles).

The cure rheology of a formulation containing scrap may be deficient in several ways. For example, the cure rheology generally exhibits a reduction in scorch time, an increase in the cure time, and a lessening of final crosslink density. As a result, formulations containing scrap begin the onset of cure more quickly (scorch) and either take an unacceptable amount of time to reach the desired level of cure or crosslink density, or fail to reach the desired cure or crosslink density. These effects are undesirable.

The use of waste material also typically negatively affects the physical properties of the completed articles. For example, resistance to compression set is reduced. This is undesirable when, for example, the finished article, such as an O-ring or a gasket, will be used to form a seal. Such applications typically require a high resistance to compression set.

SUMMARY OF THE INVENTION

The present invention relates to compositions and methods of using such compositions for the purpose of recycling or reusing at least partially vulcanized fluoroelastomers. Compositions are described which contain the at least partially vulcanized fluoroelastomer (a recycle component) which have a cure rheology similar to that of virgin fluoroelastomer compositions, i.e., compositions which contain no previously vulcanized fluoroelastomer. Compositions are also described which contain the recycle component and which have enhanced physical properties.

The present invention provides, inter alia, a means of recycling of a previously vulcanized (i.e., crosslinked) fluorinated elastomer essentially overcoming the negative effects discussed above. It provides a composition having a cure rheology similar, and in some cases virtually identical, to that of virgin fluoroelastomer compositions. This results in a significant improvement in scorch time and crosslink density as compared to previous attempts to recycle scrap fluoroelastomer. As a result, fluoroelastomer compositions of the invention can be processed in virtually the same manner as virgin fluoroelastomer compositions. Additionally, the physical properties of the crosslinked fluoroelastomers of the invention (e.g., tensile strength and compression set) are noticeably enhanced. In fact these properties approximate those obtained when virgin fluoroelastomer is crosslinked.

Compositions of the present invention include (a) a mixture of a cure-enhancing additive with a fluorinated elastomer gum, (b) a mixture of the cure-enhancing additive with an at least partial vulcanized fluorinated elastomer, and (c) a mixture of the cure-enhancing additive with the fluorinated elastomer gum and the at least partially vulcanized fluorinated elastomer. The present invention also includes an additive system useful in each of these compositions. The present invention further includes the crosslinked product resulting from curing those compositions containing the at least partially vulcanized fluorinated elastomer. The present invention still further includes a method of recycling an at least partially vulcanized fluorinated elastomer.

As used throughout this description, the following terms have the following meaning:

"Fluorinated elastomer gum" and "fluoroelastomer gum" mean an essentially uncrosslinked polymer that exhibits essentially no elastomeric behavior but that can be crosslinked to provide such behavior. This gum is also referred to herein as being a virgin gum. A virgin gum may also contain the ingredients of a suitably formulated and vulcanizable virgin compound.

"At least partially vulcanized fluoroelastomer" means a fluoropolymer that has a measurable level of crosslinking and that exhibits identifiable elastomeric behavior. These fluoroelastomers have been compounded with other materials such as crosslinking agents, acid acceptors, fillers, colorants, accelerators, process aids, etc. The at least partially vulcanized material is also referred to herein as the recycle component.

DETAILED DESCRIPTION

Figure 1:
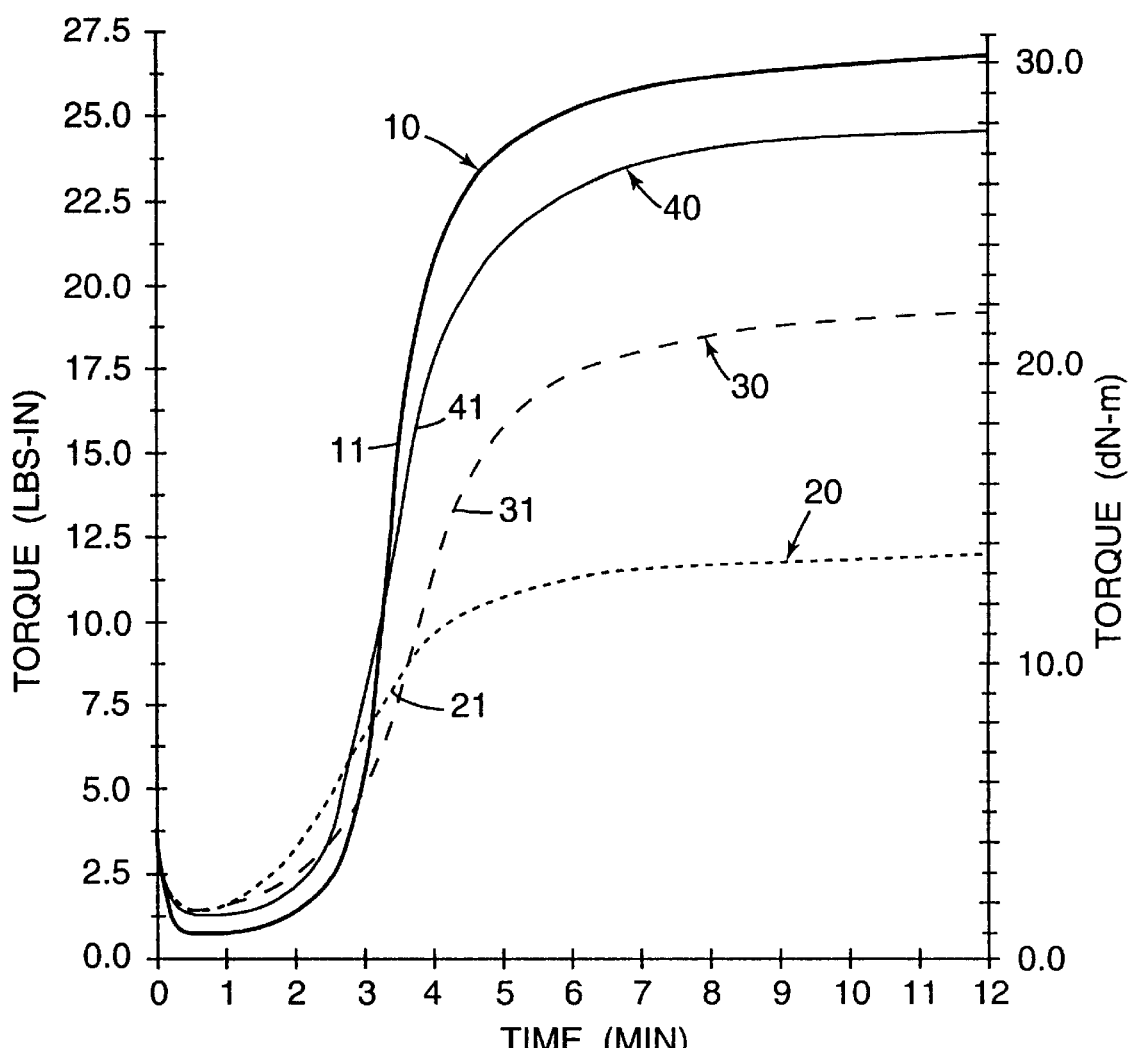
FIG. 1 shows four curves that illustrate the cure rheology of various fluoroelastomer materials. Curve 10 shows the cure rheology of a virgin elastomer gum. Curve 20 shows the cure rheology of a combination of virgin fluoroelastomer gum and a recycle component. Curve 30 shows the cure rheology of a combination of a virgin fluoroelastomer gum, a recycle component, and extra curatives. Curve 40 shows the cure rheology of a combination of virgin elastomer gum, a recycle component, extra curatives, and cure-enhancing additives. Curves 10, 20, and 30 are examples of the prior art. Curve 40 is an example of the present invention. The curves shown in FIG. 1 were generated on compositions (some of which contained a recycle component) described hereinafter using a Monsanto Moving Die Rheometer (MDR) Model 2000 in accordance with ASTM 5289-93A at 177° C., no preheat, 12 minute elapsed time and a 0.5° arc.

The unique advantages of the present invention will be more fully appreciated by reference to FIG. 1. As previously noted, curve 10 is a cure rheology curve for a virgin compounded fluoroelastomer gum. After going through an initial drop in torque the composition has a relatively long period of time at an essentially stable torque after which the torque increases rapidly to its final or maximum value. This rapid increase in torque is illustrated by the essentially vertical portion 11 of curve 10. This rapid increase in the torque corresponds to a rapid increase in the viscosity of the composition as it crosslinks. The rheology shown in curve 10 allows a sufficient amount of induction time for the composition to be formed or molded before the onset of cure. This rheology also demonstrates rapid completion of the cure cycle after the onset of cure. As a result, the cure cycle is not unnecessarily prolonged. Compositions which demonstrate this type of cure rheology can be completely formed or molded rapidly, cured to a state that they can be handled without damage, and removed from the mold for any necessary post curing.

Curves 20 and 30 show the cure rheology of prior art attempts to recycle at least partially vulcanized fluoroelastomers. In each case, the cure rheology is significantly degraded. After the initial drop in torque, the increase in torque is not as rapid as that of virgin material of curve 10. This can be seen by the shallower slopes 21 and 31 of curves 20 and 30. Additionally, the maximum torque is lower than that achieved by the virgin material of curve 10. This indicates that a lower crosslink density has been attained. As a result, such materials are more difficult to process (e.g., use to fabricate parts) and have reduced physical properties when compared to those of either virgin compositions or those of the present invention.

Curve 40 is a cure rheology curve for a composition of the invention. As can be seen, it closely follows cure rheology curve 10 of the virgin compounded fluoroelastomer gum. After the initial drop in torque, the torque increases almost as rapidly as that of the virgin material and significantly more rapidly than that of the prior art compositions. Compare slope 41 with slope 11, and slope 41 with slopes 21 and 31.

The maximum torque achieved with the composition of curve 40 also closely approximates that of the virgin material and is substantially higher than that of either of the prior art compositions exemplified by curves 20 and 30. This indicates that compositions of the invention attain a higher crosslink density, can be processed in virtually the same way as virgin materials, and have physical properties that are substantially the same as those of virgin materials and substantially better than those of the prior art compositions.

THE FLUOROELASTOMER GUM

Fluoroelastomer gums that may be used in the present invention are elastomeric polymers of one or more fluoromonomers selected from the group of vinylidene fluoride, hexafluoropropylene, chlorotrifluoroethylene, 2-chloropentafluoropropylene, perfluorinated alkyl vinyl ether, perfluorinated alkyl allyl ether, tetrafluoroethylene, 1-hydropentafluoropropylene, dichlorodifluoroethylene, trifluoroethylene, 1,1-chlorofluoroethylene, 1,2-difluoroethylene, bromotrifluoroethylene, bromodifluoroethylene, and bromotetrafluorobutene. Optionally, the aforementioned one or more fluoromonomers may be copolymerized with fluorine-free olefinic monomers such as ethylene and propylene.

The preferred elastomer gums are copolymers of vinylidene fluoride, hexafluoropropylene, and optionally tetrafluoroethylene. Preferably these polymers comprise between about 15 and about 50 mole percent hexafluoropropylene, and up to 30 mole percent tetrafluoroethylene. Mixtures or blends of different fluorinated elastomer gums, and fluoroelastomer gums of different viscosities or molecular weights, are also suitable.

The fluoroelastomer gums useful in the invention may be provided as a neat gum that is free from other additives. Alternatively, they may be provided as compounded mixtures of the gum with various other ingredients. Such ingredients include, by way of example, curatives, acid acceptors, fillers, and colorants such as dyes and pigments.

There are a number of commercially available fluoroelastomer gums that can be used in the invention. These include the FLUOREL fluoroelastomers sold by Dyneon LLC of St. Paul, Minn. Examples of these fluoroelastomers include the, FE, FC, FT, FG, FA and FX grades. Other commercially available fluoroelastomer gums that may be used in the invention include the TECHNAFLON fluoroelastomers (available from Ausimont S.p.A of Milan, Italy), the VITON fluoroelastomers (available from DuPont-Dow LLC of Wilmington, Del.) and the DIAEL fluoroelastomers (available from Daikin Industries Ltd.). Many of these gums are provided with the curative incorporated in them.

The fluoroelastomer gum is a virgin (i.e., unvulcanized) polymer to which the recycle component is added. The exact quantity of fluoroelastomer gum used in the present invention is not critical. In fact, it is not necessary to use any virgin fluoroelastomer in the practice of the invention. When it is used, however, the virgin fluoroelastomer typically comprises at least 50% by weight of the final composition.

THE RECYCLE COMPONENT

The recycle component used in the present invention comprises either partially or completely vulcanized fluoroelastomer (hereinafter "cured fluoroelastomer"). The cured fluoroelastomer is the product obtained by crosslinking the previously described fluoroelastomer gum.

The recycle component typically comprises one or more curatives, acid acceptors, fillers and frequently process aids and colorants. The level of these materials present in the recycle component is not critical to the invention. In fact, the level varies widely.

The recycle component typically comprises flash or out-of-specification material. Flash (or runners) is the excess material resulting from molding an article (or a string of articles). Flash is generally only partially vulcanized, and therefore, only partially crosslinked. Out-of-specification material includes parts that have surface defects, that are not within dimensional tolerance, that are not fully formed, or that do not have the required physical properties. They may be either partially or completely vulcanized.

One or more cured fluoroelastomers may be used in the recycle component. Additionally, the cured fluoroelastomer may have been prepared from the same or a different gum than that used in the virgin fluoroelastomer gum.

Useful primary fluoroelastomers will include the same materials listed above as the waste product. Recycle of a similar partially vulcanized or fully vulcanized fluoroelastomer back into a primary fluoroelastomer of the same type or at least one derived from the same monomer components will likely be the most straight forward. However, materials which are not similar may also be used in the described process.

The quantity of recycle component used in the present invention is influenced by the desired processing properties and physical properties in the finished article. For less demanding applications, higher ratios of the recycle component are possible. This could include usage levels as high as 100% recycle plus the cure-enhancing additives described below. For the more critical applications, such as those which require a superior compression set resistance, or a maximum crosslink density, recycle usage up to 50% is possible with little or no degradation in critical physical properties.

THE ADDITIVE SYSTEM

The additive system used in the invention comprises a cure-enhancing additive, a crosslinking agent, and an accelerator.

THE CURE-ENHANCING ADDITIVE

The cure-enhancing additives used in the present invention improve the cure rheology of prior art attempts to recycle cured fluoroelastomers. This is demonstrated by the improvement in final crosslink density of a recycle-containing composition according to the invention over the final crosslink density of a prior art recycle-containing composition. Particularly preferred compositions of the invention also exhibit lower compression set values than do prior art recycle-containing compositions.

Example of useful cure-enhancing additives include fluoroaliphatic sulfonamides and free radical scavengers. Combinations of these material may be used if desired. Thus, for example, one may use one or more fluoroaliphatic sulfonamides, or one or more free radical scavengers. Additionally, one may use one or more fluoroaliphatic sulfonamides and one or more free radical scavengers.

The fluoroaliphatic sulfonamides useful in the present invention typically have one or two sulfonamido groups. Useful classes of these materials can be represented by the general formula:

or

wherein $R_f$ represents a monovalent fluoroaliphatic radical having, for example, from 1 to 20 carbon atoms, preferably 4 to 10 carbon atoms, $R'_f$ represents a divalent fluoroaliphatic radical having, for example, from 1 to 20 carbon atoms, preferably from 2 to 10 carbon atoms, A represents an organic linkage such as $—CR^1R^2—$, $—CR^1R^2CR^3R^4—$, and $—CR^1=CR—$, wherein $R^1, R^2, R^3$, and $R^4$ are selected from the group consisting of hydrogen atom, fluorine atom, chlorine atom, and lower alkyl group, having, for example, 1 to 2 carbon atoms, R represents hydrogen atom or alkyl radical having, for example, from 1 to 20 carbon atoms, preferably 1 to 12 carbon atoms, and M represents hydrogen atom or salt forming cation with valence x, which is 1, 2, or 3.

The monovalent fluoroaliphatic radical, $R_f$, is a fluorinated, stable, inert non-polar, saturated moiety. It can be straight chain, branched chain, and, if sufficiently large, cyclic, or combinations thereof, such as alkyl cycloaliphatic radicals. Generally, $R_f$ will have 1 to 20 carbon atoms, preferably 4 to 10, and will contain 40 to 83 weight percent, preferably 50 to 78 weight percent fluorine. Particularly useful compounds are those in which the $R_f$ group is fully or substantially completely fluorinated, as in the case where $R_f$ is perfluoroalkly, $C_nF_{2n+1}$, where n is 1 to 20.

The divalent fluoroaliphatic radical, $R'_f$, is a fluorinated, stable, non-polar, saturated moiety. It can be straight chain, branched chain, and, if sufficiently large, cyclic, or combinations thereof, such as alkylcycloaliphatic diradicals. Generally, $R'_f$ will have 1 to 20 carbon atoms, preferably 2 to 10. Particularly useful compounds are those in which the $R'_f$ group is perfluoroalkyl, $C_nF_{2n}$, where n is 1 to 20, or perfluorocycloalkyl, $C_nF_{2n-2}$, where n is 5 to 20.

With respect to either $R_f$ or $R'_f$, the skeletal chain or carbon atoms can be interrupted by divalent oxygen or trivalent nitrogen hetero atoms, each of which is bonded only to carbon atoms, but preferably where such hetero atoms are present, such skeletal chain does not contain more than one said hetero atom for every two carbon atoms. An occasional carbon-bonded hydrogen atom, or chlorine atom may be present; where present, however, they preferably are present not more than once for every two carbon atoms in the chain. Where $R_f$ or $R'_f$ is or contains a cyclic structure, such structure preferably has 5 or 6 ring member atoms, 1 or 2 of which can be said hetero atoms. Examples of $R'_f$ are fluorinated alkylene, e.g., $—C_4F_8—$, $—C_6F_{12}—$. Where $R_f$ is designated as a specific radical, e.g., $C_8F_{17}—$, it should be understood that this radical can represent an average structure of a mixture, e.g., $C_6F_{13}—$ to $C_{10}F_{21}—$, which mixture can also include branched structures.

Where R is an alkyl radical, it can be unsubstituted or substituted. Useful substituents include, for example, carbonyl groups, e.g.,

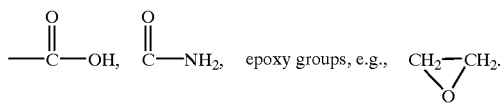

Fluoroaliphatic sulfonamides suitable as curing agents in the practice of this invention include known compounds [see, for example, U.S. Pat. No. 2,732,398 (Brice et al.)]. They can be prepared by the reaction of ammonia or primary amines with perfluoroalkane sulfonyl fluorides (obtained by electrochemical fluorination of alkyl or alkylene sulfonyl halides), as shown by the following reaction scheme:

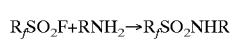

They can also be prepared following the procedures described in U.S. Pat. No. 4,296,034 (Bouvet et al), i.e.,

Salts of the sulfonamides can be prepared by reaction of the acidic sulfonamide compound with a suitable base, as described, for example, in U.S. Pat. No. 2,803,656 (Ahlbrecht et al):

$R_fSO_2NHR + NaOCH_3 \rightarrow R_fSO_2N(R)^-Na^+$

Representative fluoroaliphatic sulfonamide compounds suitable for the practice of this invention include the following:

$CF_3SO_2NH_2$
$CF_3SO_2N(C_4H_9)H$
$C_4F_9SO_2N(CH_3)H$
$C_8F_{17}SO_2N(CH_3)H$
$C_8F_{17}SO_2N(CH_3)^-Na^+$
$C_8F_{17}C_2H_4SO_2N(CH_3)^-Na^+$
$HN(CH_3)SO_2(CF_2)_8SO_2N(CH_3)H$
$C_8F_{17}SO_2NH^-Na^+$
$C_8F_{17}SO_2N(C_{12}H_{25})H$
$C_6F_{13}SO_2N(C_2H_5)^-K^+$
$C_8F_{17}SO_2N(C_6H_5)H$
$C_4F_9CH_2SO_2N(CH_3)H$
$C_8F_{17}SO_2N(CH_3)^-Mg^+{}_{1/2}$
$C_8F_{17}C_2N(CH_3)^-NH_4^+$
$C_8F_{17}SO_2N(CH_3)^-N(C_2H_5)_3H^+$

Free radical scavengers represent another class of cure-enhancing additives useful in the present invention. The free radical scavengers are typically hydrogen-donating compounds. They may be used in low concentrations. The free radical scavengers useful in the invention include those that are known and are commercially available. See for Example, "Encyclopedia of Polymer Science and Engineering," Vol. 2, pp 75–82 and 86–90, John Wiley & Sons, 1985. Representative examples of useful free radical scavengers include phenol compounds, phosphite compounds, thioester compounds, and amine compounds.

Useful phenol compounds include both mono-, di-, and polyphenols. Examples of these materials are di-tertiary-butylphenol, styrenated phenol, 2,2'-methylenebis(4-methyl-6-tert-butylphenol), 4,4'-methylenebis(2,6-di-tert-butylphenol), and 1,3,5-trimethyl-2,4,6-tris(3',5'-di-tert-butyl-4'-hydroxybenzyl)-benzene.

Useful phosphite compounds include tris (nonylphenyl) phosphite, distearyl pentaerythritol diphosphite, and tetrakis (2,4-di-tert-butylphenyl)4,4'-biphenylylenediphosphite.

Examples of useful thioester compounds include distearyl-thio-propionate, didodecyl 3,3'-thiodipropionate, dimyristyl thiodipropionate, and ditridecyl thiodipropionate.

Examples of useful amine compounds include one or more (and preferably one or two) amino nitrogen atoms and at least one aryl group (or group containing one or more aryl moieties) bonded to an amino nitrogen atom. Preferably each amino nitrogen atom in the amino compound will be bonded to an aryl group or group containing one or more aryl moieties. However, no amino nitrogen atom in the amine compound can be directly bonded to the methylene carbon atom of an arylmethylene group.

Representative classes of useful amine compounds include diaryldiamines, diarylamines, diarylarylenediamines, dialkylarylenediamines, diarylalkylenediamines, tetraalkylarylenediamines, tetraarylarylenediamines, tetra(mixed alkyl/aryl) arylenediamines and tetra (mixed alkyl/aryl) alkylenediamines. Many of the amine compounds useful in this invention are generally known and are commercially available, see for example, Nicholas P. P., Luxeder, A. M., Brooks, L. A., Hommes, P. A., "Antioxidant and Antiozonants", Kirk-Othmer, *Encyclopedia of Chemical Technology*, Vol. 3, pp. 128–142, 3rd ed., John Wiley & Sons, 1978.

A useful class of amine compounds can be represented by the following formula:

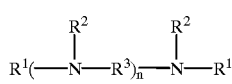

III where:

$R^1$ is independently selected from substituted and unsubstituted alkyl, aryl, aralkyl, and alkaryl groups;

$R^2$ is independently selected from H, and substituted and unsubstituted alkyl, aryl, aralkyl and alkaryl groups;

$R^3$ is selected from substituted or unsubstituted arylene, alkylene, alkarylene, and aralkylene groups;

n is a number from 0 to 3;

at least one $R^1$, $R^2$ or $R^3$ group will be an aryl group or a group containing one or more aryl moieties; and no amino nitrogen atom will be bonded directly to the methylene carbon atom of an arylmethylene (e.g., benzyl) group. Examples of substituents of the $R^1$, $R^2$ and $R^3$ groups include halogen atoms, alkyl (e.g., methyl, octyl, and t-butyl), alkoxy, alkythio and aryl groups.

Examples of particularly useful amine compounds are N,N'-di-beta-naphthyl-para-phenylene diamine (i.e., $C_{10}H_7$—NH—$C_6H_4$—NH—$C_{10}H_7$, formerly commercially available as "AGERITE WHITE", $C_6H_5$—NH—$C_6H_4$—NH—$C_6H_5$, available commercially as "AGERITE DPPD", both compounds available from R. T. Vanderbilt Company, Inc., $C_6H_5$—NH—$C_6H_5$ and para, Cl—$C_6H_4$—N($C_6$—$H_5$)—$C_6H_4$—N($C_6H_5$)—$C_6H_4$-Cl para.

The following table lists a number of commercially available amine compounds, including the AGERITE™ materials, that are useful in the invention.

| Amine Structure | MW | Source | Product Name |
|---|---|---|---|
| $C_{10}H_7$—NH—$C_6H_4$—NH—$C_{10}H_7$ | 360 | Vanderbilt | AGERITE WHITE |
| $C_6H_5$—NH—$C_6H_4$—NH—$C_6H_5$ | 260 | Vanderbilt | AGERITE DPPD |
| $CH_3(CH_2)_6NH$—$C_6H_4$—$NH(CH_2)_6CH_3$ | 304 | Pfaltz & Bauer | 026430 |
| $C_6H_5$—NH—$CH_2CH_2$—NH—$C_6H_5$ | 212 | Aldrich | D2700-4 |
| [para Cl—$C_6H_4$—N($C_6H_5$)]$_2$—$C_6H_4$ | 481 | TCI | B1336 |
| $(CH_3)_2N$—$C_6H_4$—$N(CH_3)_2$ | 164 | Aldrich | 16020-2 |
| 4-phenylpiperidine | 161 | Aldrich | 14861-1 |
| $C_6H_5$—NH—$C_6H_5$ | 169 | Fisher | D-91 |

-continued

| Amine Structure | MW | Source | Product Name |
|---|---|---|---|
| $C_6H_5COO-N=\!\!\!\!\bigcirc\!\!\!\!=N-OOCC_6H_5$ | 346 | Naugatuck | Dibenzo GMF |

Any cure-enhancing additive may be used by itself. Alternatively, any combination of the cure-enhancing additives may be used in the invention.

An effective amount of cure-enhancing additive is used in the invention. An effective amount is that which improves the maximum torque attained over that attained using a comparable composition that does not contain the cure-enhancing additive. The precise amount of cure-enhancing additive employed is influenced by a number of factors including the molecular weight of the particular additive molecule, the degree to which the recycle component has been crosslinked, and the amount of recycle component being added. Generally, the cure-enhancing additive is present in amounts ranging from 1 to 1000 millimoles per 100 parts (mmhr) of the recycle component composition employed. Preferably, the cure-enhancing additive is present in amounts ranging from 1 to 50 mmhr, and more preferably in amounts ranging from 1 to 25 mmhr.

THE CROSSLINKING AGENT

Crosslinking agents useful in the additive system are those useful for curing vinylidene fluoride-containing polymers. These crosslinking agents, also known as curing agents, include both the conventional curing agents used to cure fluoroelastomers, i.e., organic and inorganic peroxides, polyhydroxy compounds or derivatives thereof, organic polyamines or derivatives thereof, and fluoroaliphatic polyols and allyl ethers and carbonates of aromatic polyhydroxy compounds.

The polyhydroxy compounds and their derivatives represent a preferred class of curatives. The compounds are well known and are described in the art in U.S. Pat. Nos. 4,259,463; 3,876,654; 4,233,421 and 5,262,490. Polyhydroxy compounds useful in the invention are also described in U.S. Pat. Nos. 3,655,727; 3,721,877; 3,857,807; 3,686,143; 3,933,372; and 4,358,559. The disclosures of these references with regard to these compounds is incorporated herein by reference. These compounds can be either aromatic or aliphatic polyhydroxy compounds or their derivatives. Blends of such compounds may be used if desired.

Representative examples of useful crosslinking agents are:

Hydroquinone, resorcinol
4,4'-dihydroxydiphenylsulfone (Bisphenol S)
2,4'-dihydroxydiphenylsulfone
2,2-isopropylidine-bis(4-hydroxybenzene) (Bisphenol A)
2,2-hexafluoroisopropylidine-bis (4-hydroxybenzene) (Bisphenol AF)
4,4'-dihydroxybenzopheonone
4,4'-biphenol
1-allyloxy-4-hydroxybenzene
Bisphenol A monoallyl ether
Dicarbonate blocked Bisphenol AF compounds
1,4-bis(hydroxymethyl) perfluorobutane
Hexamethylenediamine carbamate
N,N'-dicinnamylidene-1,6-hexanediamine.
Mixtures of the foregoing can also be used.

THE ACCELERATOR

Accelerators useful in the invention are organo-onium compounds. These compounds accelerate the cure of the composition of the invention.

The organo-onium compounds are phosphonium, ammonium, or sulfonium compounds which are conjugate acids of a phosphine, amine, or sulfide. They can be formed by reacting said phosphine, amine, or sulfide with a suitable alkylating agent (e.g., an alkyl halide or acyl halide) resulting in the expansion of the valence of the electron donating phosphorus, nitrogen, or sulfur atom and a positive charge on the organo-onium compound. The organo-onium compounds suitable for use in this invention are known and are described in the art. See, for example, U.S. Pat. Nos. 4,882,390 (Grootaert et al.), 4,233,421 (Worm), 5,086,123 (Guenthner et al.), and 5,262,490 (Kolb et al.) which descriptions are incorporated by reference.

Said phosphonium compounds include those selected from the group consisting of amino-phosphonium, phosphorane (e.g., triarylphosphorane), and phosphorous containing iminium compounds.

One class of phosphonium or ammonium compounds broadly comprises relatively positive and relatively negative ions (the phosphorous or nitrogen atom generally comprising the central atom of the positive ion), these compounds being generally known as ammonium or phosphonium salts or compounds.

Another class of phosphonium compounds useful in this invention are amino-phosphonium compounds some of which are described in the art, see for example, U.S. Pat. No. 4,259,463 (Moggi et al.).

Another class of phosphonium compounds useful in this invention are phosphorane compounds such as triarylphosphorane compounds; some of the latter compounds are known and are described in the art, see for example, U.S. Pat. No. 3,752,787 (de Brunner), which descriptions are herein incorporated by reference.

Another class of iminium compounds useful in this invention are described in the art, e.g., European Patent Applications 182299A2 and 120462A1 which descriptions are herein incorporated by reference.

Representative phosphonium compounds include tetramethylphosphonium chloride, tetrabutylphosphonium chloride, tributylbenzyl phosphonium chloride, tributylallylphosphonium chloride, tetraphenylphosphonium chloride, benzyltris(dimethylamino)phosphonium chloride, bis(benzyldiphenylphosphine)iminium chloride, and triphenylbenzylphosphonium chloride.

Sulfonium compounds useful in this invention are known and described in the art, e.g., see U.S. Pat. No. 4,233,421 (Worm). Briefly described, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. Said organic moieties can be the same or different. The sulfonium compounds may have more than one relatively positive sulfur atom, e.g., $[(C_6H_5)_2S^+C_6H_4S^+(C_6H_5)_2]2Cl^-$, and two of the carbon-sulfur covalent bonds may be between the carbon atoms of a divalent organic moiety, i.e., the sulfur atom may be a heteroatom in a cyclic structure.

The relative quantities of the cure-enhancing additive, the crosslinking agent and the accelerator used in the additive system are influenced by the amount of recycle component being employed, the degree to which the recycle component has been crosslinked, and the level or type of improvement desired in the finished product. The precise level of the additive system employed is that which is effective in improving the cure rheology of the composition of the invention as compared with that of a similar composition that does not employ the additive system.

Typically, the additive system will comprise from about
(a) 1 to 45 weight percent of the cure-enhancing agent,
(b) 1 to 75 weight percent of the crosslinking agent, and
(c) 1 to 40 weight percent of the accelerator.

Generally, the additive system comprises from about
(a) 1 to 30 (preferably 10 to 25) weight percent of the fluoroaliphatic sulfonamide and 1 to 15 (preferably 5 to 15) weight percent of the free radical scavenger,
(b) 1 to 65 (preferably 35 to 50) weight percent of the crosslinking agent, and
(c) 1 to 35 (preferably 10 to 25) weight percent of the accelerator.

The quantity of the additive system used in the invention is also that which is effective to improve the cure rheology of a composition of the invention as compared to a similar composition that does not employ the additive system. Generally, this level of the additive system used will be that which provides the previously discussed quantities of cure-enhancing additives to the final composition.

OTHER ADJUVANTS

A variety of other adjuvants may be employed in the compositions of the invention. Such materials include acid acceptors, colorants, processing aids, and reinforcing fillers.

Useful acid acceptors can be inorganic or organic compounds. Organic acid acceptors include sodium stearate and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The preferred acid acceptors are magnesium oxide and calcium hydroxide. The acid acceptors can be used singly or in combination and typically are used in amounts ranging from 2 to 25 parts per 100 parts by weight of the virgin gum.

Colorants useful in the invention are dyes or pigments. The most common pigment is carbon black.

Processing aids useful in the invention may include carnauba wax, aliphatic esters, carboxylic acids, and diorgano sulfur oxides such as dichlorodiphenylsulfone.

The cured fluoroelastomer may be recycled according to the invention by preferably reducing the recycle component to a size suitable for easy handling, refining the cured fluoroelastomer, blending the additive system with the cured fluoroelastomer and crosslinking the resulting blend.

The size of the cured fluoroelastomer can be reduced by grinding or comminuting using the methods described in U.S. Pat. Nos. 4,535,941; 4,625,922; and 5,411,215.

The cured fluoroelastomer can be refined by mixing it in an internal mixer, or milling it on a two-roll mill. Both types of devices are well known in the art. The two-roll mills have the ability to process materials at a small nip (that is a narrow gap between the rolls).

Refining assists in recycling the cured fluoroelastomer by breaking the crosslinks present and reducing the molecular weight of the cured fluoroelastomer. Refining can be carried out with or without the additive system being present. Preferably the cured fluoroelastomer is refined until a continuous mass is obtained, after which the additive system is blended into the mass.

A particularly useful means of recycling the cured fluoroelastomer employs a carrier gum in combination with the recycle component and the additive system. The carrier gum may be any uncured fluoroelastomer that is compatible with the final composition. Examples of such carrier gums include the uncured fluoroelastomers described previously as fluoroelastomer gums. The carrier gum is employed to facilitate the incorporation of the additive system. Typically, the additive system is blended into the carrier gum. This blend may then be combined with the recycle component on, for example, a conventional two-roll mill, a refining mill, or an internal mixer to blend in the recycle component. The type of mixing device used will depend on the amount and form of recycle component to be used. The carrier gum is usually present as a minority component. The exact amount used will be varied depending on the crosslink density of the cured fluoroelastomer, the amount of recycle component desired in the final composition, etc. A typical range of carrier gum to recycle component is 0 to 100 parts of carrier gum to 100 parts of recycle component. A preferred range for optimum property enhancement is 10 to 30 parts carrier gum to 100 parts recycle component. However, more or less carrier gum may be used if desired.

The blend of recycle component, additive system, and optional carrier gum may be used by itself if desired. Alteratively it may be combined with the virgin fluoroelastomer gum to form the final composition. In either case, the other adjuvants are typically added at this time. In the latter case, the various components, including the other adjuvants, may be combined on a two-roll mill or in an internal mixing device using techniques known in the art.

The techniques used for refining and final blending are somewhat dissimilar. For example, when a two-roll mill is employed the ratio of roll speeds is typically in the range of 1:1 or higher. Ratios of 1.4:1 to 2.0:1 are preferred for the refining step. Lower ratios, e.g., 1.1 to 1.4 can be used. But residence time may need to be increased. A tight mill roll gap or nip is beneficial in providing sufficient shear rate in the vicinity of 200–1000 $sec^{-1}$ or preferably 300–700 $sec^{-1}$ for suitable residence or processing time.

Final blending is typically done at a wider nip setting or less roll speed differential resulting in more conventional shear rates of 50–200 $sec^{-1}$, typically 100–150 $sec^{-1}$.

The exact ratio of roll speeds in refining and final blending is determined by the result desired in the finished product.

For best results the temperature of the mixture on the mixing device should not rise above about 120° C. During mixing it is necessary to distribute the components and adjuvants uniformly throughout the composition.

The curing process typically comprises extrusion or pressing the final composition in a mold, e.g., a cavity or a transfer mold, and subsequently oven curing. The composition of this invention is particularly useful for injection molding. Pressing of the compounded mixture (press cure) is typically conducted at a temperature between about 95° C. and about 230° C., preferably between about 150° C. and about 205° C. for a period of from 1 minute to about 15 hours, usually from 5 minutes to 30 minutes. A pressure of between about 700 kPa and about 20,600 kPa, preferably between about 3,400 kPa and about 6,800 kPa is imposed on the compounded mixture in the mold. The molded vulcanizate is then usually post cured (oven cured) at a temperature between about 150° C. and about 315° C., usually at about 232° C. for a period of from about 2 hours to 50 hours or more depending on the cross-sectional thickness of the sample. For thick sections, the temperature during the post cure is usually raised gradually from the lower limit of the range to the desired maximum temperature selected. For thinner cross-sections, e.g., less than 5 mm, the vulcanizate or cured sheet section may be put into the oven at the desired maximum temperature. The maximum temperature used is preferably about 260° C. and is held at this value for about 4 hours or more.

One major utility of the vulcanized compositions of this invention lies in their use as shaft seals in automotive applications, gaskets, O-rings and the like, for containing fluids under pressure at elevated temperatures, as, for example, in hydraulic systems in aircraft, or as components of reactors and fluid transfer lines used in the processing of chemicals.

The following examples are offered to aid in a better understanding of the present invention and are not to be unnecessarily construed as limiting the scope thereof.

EXAMPLES

In the following examples, quantities of at least partially vulcanized fluoroelastomers are incorporated into compositions of the invention and cured and tested. The compounding was done on a conventional two-roll mill (13 in×6 in/32.5 cm×15 cm) with a 1.4 to 1 ratio and a surface speed on the slow roll of 7.6 in/sec (19.1 cm/sec). Testing was done using the following test methods.

TEST METHODS

Mooney viscosity was determined by ASTM 1646-94 (MS 121° C.). Results are reported in Mooney units.

Cure Rheology Tests were run on compounded admixtures using a Monsanto Moving Die Rheometer (MDR) Model 2000 in accordance with ASTM D 5289-93a at 177° C., no preheat, 12 minute elapsed time (unless otherwise specified) and a 0.5° arc. Minimum torque ($M_L$), Maximum torque ($M_H$), i.e., highest torque attained during specified period of time when no plateau or maximum was obtained. Also reported were: $t_S2$ (time for torque to increase 2 units above $M_L$), t'50 (time for torque to reach $M_L+0.5[M_H-M_L]$), and t'90 (time for torque to reach $M_L+0.9[M_H-M_L]$).

Press-cured samples (150×150×2.0 mm sheets, unless otherwise noted) were prepared for physical property determination by pressing at about 6.9 MegaPascals (MPA) for the indicated amount of time and temperature.

Post-cured samples were prepared by placing a press-cured sample in a circulating air oven. The oven was maintained at 232° C. and the samples treated for 16 hours (unless otherwise noted).

Compression set determined by ASTM D 395-89 Method B with 0.139 inch (3.5 mm) O-rings compressed for 70 hours at 200° C. Results are reported as %.

MATERIAL GLOSSARY

The following materials were used in the Examples:

| | |
|---|---|
| Fluorel ™ Fluoroelastomer FE-5620Q | Unvulcanized dipolymer fluoroelastomer gum containing incorporated curatives, (typical fluorine content of 65.9%, approximate Mooney viscosity of 23) available from Dyneon LLC, St. Paul, Minnesota |
| Fluorel ™ Fluoroelastomer FC-2179 | Unvulcanized dipolymer fluoroelastomer gum containing incorporated curatives, (typical fluorine content of 65.9%, approximate Mooney viscosity of 80 at 121° C.) available from Dyneon LLC, St. Paul, Minnesota |
| Copolymer A | Copolymer of 78 mole % vinylidene difluoride ($VF_2$) and 22 mole % hexafluoropropylene (HFP), (approximate Mooney viscosity of 75 at 121° C.) |
| Copolymer B | Copolymer of 78 mole % $VF_2$ and 22 mole % HFP (approximate Mooney viscosity of 20 at 121° C.) |
| Carbon Black | N-990 available from J. P. Huber Corp. of Borger, Texas |
| Ca(OH)$_2$ | HP Grade available from C. P. Hall |
| MgO | Elastomag ™ 170 available from Morton of Manistee, Michigan |
| Bisphenol AF | HO-Ø-C(CF$_3$)$_2$-Ø-OH available from Aldrich Chemical Co. |
| Accelerator A | Reaction product of equimolar quantities of triphenyl benzyl phosphonium chloride (available from Aldrich Chemical Co.) and the sodium salt of Bisphenol AF as described in U.S. Pat. No. 5,262,490. |
| Accelerator B | Reaction product of equimolar quantities of triarylsulfonium chloride (available from Auto Corporation) and the sodium salt of Bisphenol AF |

| | -continued |
|---|---|
| | as described in U.S. Pat. No. 5,262,490. |
| dtbP | Di-tertiary butyl phenol available from Aldrich Chemical Co. |
| DBS | Dibutyl sebacate available from Harwick Chemical Co. |
| DPPD | AGERITE DPPD ($C_6H_5$—NH—$C_6H_4$—NH—$C_6H_5$) available from R. T. Vanderbilt Company, Inc. |
| DBS/DPPD | 50/50 blend of DBS and AGERITE DPPD |
| Irganox | Irganox 1520, a phenol-containing free radical scavenger available from Ciba Geigy |
| Irgafos | Irgafos 168, a phosphite-containing free radical scavenger available from Ciba Geigy |
| DSTDP | Distearyl-thio-dipropionate free radical scavenger available from Cytec |
| CF-120 | Tocopherol, a free radical scavenger available from Rhonotec |

Examples 1–9

The following examples of the invention were prepared by making a recycle component and a carrier gum. The recycle component, the carrier gum, an additive system and a fluoroelastomer gum were then combined, press-cured and tested. The compositions employed and the results obtained are set out in Table 1.

A partially vulcanized fluoroelastomer (the recycle component) was prepared from the following formulation:

| Component | Parts by Weight |
|---|---|
| FE-5620Q | 100 |
| N-990 | 30 |
| $Ca(OH)_2$ | 6 |
| MgO | 3 |

The components were combined together on a conventional two-roll mill until a uniform blend was obtained. The blend was removed from the mill pressed into sheets about 2 mm thick and partially cured (i.e., press-cured). Pressing and partially curing took place at 177° C. for 12 minutes. The resulting sheets of recycle component were cut into small pieces (i.e., about 12 cm square) for future use.

A carrier gum was made on a conventional two-roll mill by combining the following components:

| Component | Parts by Weight |
|---|---|
| Copolymer A | 50 |
| Copolymer B | 50 |
| Bisphenol AF | 5.96 |
| Accelerator A | 1.97 |
| Accelerator B | 2.78 |
| $C_8F_{17}SO_2NHCH_3$ | 4.17 |
| Free Radical Scavenger | 2.08 |

The carrier gum components were combined together on the mill and blended until a uniform mixture was obtained. The resulting carrier gum was then removed from the mill in an uncured state.

The nip of the mill was then tightened to 0.006 inches (0.15 mm). This represented a shear rate of about 500 $sec^{-1}$. Full cooling was applied to the mill. Twenty-five grams of the carrier gum were added to the nip. Then, 75 g of the recycle component were slowly added to the nip. The recycle component first formed a crumbled powder, and then formed a compound that banded on the mill and could be worked into the carrier gum. The resulting carrier/recycle blend was removed from the mill.

The final composition was made by blending 84 g of FE-5620Q, 27.9 g carbon black, 5.6 g $Ca(OH)_2$ and 2.8 g MgO on the two roll mill. To this was added 41.7 g of the carrier/recycle blend.

The resulting composition had an overall loading of fluoroelastomer gum as follows:

70 parts FE-5620Q 7.5 parts of the Copolymer A and Copolymer B component of the carrier gum composition 22.5 parts of the FE-5620Q from the recycle component.

100 parts total

The above composition was then filled to an overall loading of 30 phr (parts per hundred of rubber or gum) of N-990 carbon black, 6 phr of $Ca(OH)_2$ and 3 phr of MgO. Because the recycle component already contained 30 phr carbon black, 6 phr $Ca(OH)_2$ and 3 phr MgO, the actual quantities of these materials added to the mill were adjusted accordingly to give the final overall composition.

The finished product contained virgin fluoroelastomer gum composition, carrier gum, recycle component, extra curatives for the recycle component and cure-enhancing additives. Rheology (cure curve) testing was performed on the finished composition before any press-curing was done. The finished composition was then press-cured into a sheet for 12 minutes at 177° C. and post-cured for 16 hours at 232° C. Physical properties were tested on post-cured sheets. Compression set results were obtained after a 70 hours test at 200° C. The results are listed in Table 1.

Comparative Example C1

This example consisted of the following virgin fluoroelastomer gum composition:

| FE-5620Q | 100 g |
|---|---|
| Carbon Black | 30 g |
| $Ca(OH)_2$ | 6 g |
| MgO | 3 g |

The ingredients were combined on a two-roll mill until a uniform blend was obtained. The blend was removed from the mill, pressed into sheets about 2 mm thick. The finished product contained no carrier gum and no recycle component, extra curative, or cure-enhancing additives. Rheology testing and physical property testing was done as in Examples 1–9. The results are listed in Table 1.

Comparative Example C2

This comparative example was prepared and tested as described in Examples 1–9 except that the carrier gum employed comprised only Copolymer A and Copolymer B. This composition included virgin fluoroelastomer gum, partially vulcanized recycle component and carrier gum but no extra curative, no cure accelerator or cure-enhancing additives. The results of the tests are listed in Table 1.

Comparative Example C3

This example was prepared and tested as in Examples 1–9 except that the carrier gum employed no $C_8F_{17}SO_2NHCH_3$ and no free radical scavengers. This composition included virgin fluoroelastomer gum composition, carrier gum, recycle component, extra curative, but no cure-enhancing additives. The test results are listed in Table 1.

The cure rheology curves of Comparative Examples C1, C2, C3, and Example 9 are illustrated as curves 10, 20, 30 and 40 respectively in FIG. 1.

tive Examples C2 or the recycle component plus additional curatives as was done in Comparative Example C3. The data further shows that final crosslink density approximates that of the virgin gum composition.

Examples 10–12

Fluoroelastomer gum and recycle component were prepared as described in Examples 1–9. One hundred grams of the recycle component were refined on a two-roll mill having a nip setting of 0.15 mm (corresponding to a shear of about 500 reciprocal seconds). Full cooling was applied to the mill. No carrier gum was used. The recycle component first formed a crumbled powder and then banded to the mill and could be worked. Extra curatives (1.02 g of Viton™ Cure 50 curative, a mixture of Bisphenol AF and phosphonium curatives available from DuPont-Dow LLC, and 0.32 g of Bisphenol AF), 4.17 g of $C_8F_{17}SO_2NHCH_3$ and 2.08 g of free radical scavenger were added to the recycle component and blended into it. The free radical scavenger was used in Examples 11 and 12 only. Then 345 g of the compounded virgin fluoroelastomer gum of Comparative Example C1 was added to the blend of recycle component, extra curatives, and cure-enhancing additives. This composition was milled until a uniform blend was achieved. The final

TABLE 1

| | | Cure-Enhancing Additive | | | | | | | |
|---|---|---|---|---|---|---|---|---|---|
| Ex. | Recycle Component | Carrier Gum | $C_8F_{17}SO_2NHCH_3$ | Free Radical Scavenger | $M_L$ (dN-m) | $M_H$ (dN-m) | $t_s2$ (min) | t'50 (min) | t'90 (min) | Compression Set % |
| C1 | No | No | No | No | 0.9 | 30.2 | 3.4 | 3.4 | 5.1 | 17.3 |
| C2 | Yes | Yes | No | No | 1.7 | 13.9 | 2.5 | 3.1 | 5.4 | 25.6 |
| C3 | Yes | Yes | No | No | 1.6 | 21.8 | 2.1 | 3.8 | 6.2 | 23.1 |
| 1 | Yes | Yes | Yes | No | 1.6 | 26.2 | 2.5 | 3.8 | 5.9 | 21.9 |
| 2 | Yes | Yes | Yes | dtbP | 1.5 | 25.4 | 2.4 | 3.6 | 5.8 | 18.8 |
| 3 | Yes | Yes | Yes | Irganox | 1.5 | 26.7 | 2.3 | 3.4 | 5.6 | 26.9 |
| 4 | Yes | Yes | Yes | Irgafos | 1.5 | 25.2 | 2.3 | 3.4 | 5.5 | 20.8 |
| 5 | Yes | Yes | Yes | DPPD | 1.6 | 26.0 | 2.4 | 3.7 | 5.9 | 21.0 |
| 6 | Yes | Yes | Yes | DBS | 1.5 | 27.7 | 2.4 | 3.4 | 5.5 | 20.1 |
| 7 | Yes | Yes | Yes | DSTDP | 1.6 | 27.9 | 2.4 | 3.5 | 5.6 | 20.8 |
| 8 | Yes | Yes | Yes | CF-120 | 1.7 | 24.7 | 1.8 | 2.6 | 4.3 | 24.7 |
| 9 | Yes | Yes | Yes | DBS/DPPD | 1.6 | 27.2 | 2.5 | 3.4 | 5.2 | 19.6 |

The data in Table 1 show that Comparative Example C1, virgin fluoroelastomer gum composition (i.e., one free of a recycle component), has the highest final crosslink density (as shown by the highest $M_H$) and the best compression set (i.e., the lowest compression set value). It also shows that this composition reaches its maximum crosslink density very rapidly.

By way of contrast, Comparative Example C2 shows that incorporating a recycle component into the virgin fluoroelastomer without adding extra curatives significantly reduces the final crosslink density and negatively affects its compression set. The reduction in compression set is shown by the increase in the compression set value.

Comparative Example C3 shows that the addition of extra curatives to a composition like that of Comparative Example C2 improves the final crosslink density. However, the final crosslink density is still well below that of the virgin material. Further, the compression set is still negatively affected as shown by the high compression set value when compared to that of virgin material.

Examples 1–9 each show that when the cure-enhancing additives are used, the final crosslink density of the cured composition is significantly better than that achieved by merely adding recycle component as was done in Comparacomposition included virgin fluorinated elastomer gum composition, partially vulcanized recycle component, extra curatives and cure-enhancing additives. The compositions were cured and tested as described in Example 1. The results obtained are shown in Table 2.

Comparative Example C4

This example was prepared and tested as described in Examples 10–12 except that no extra curative and no cure-enhancing additives were used. The final composition consisted of virgin fluoroelastomer gum, the recycle component but no carrier gum, extra curatives or cure-enhancing additives. The test results are shown in Table 2.

Comparative Example C5

This example was prepared and tested as described in Examples 10–12 except that no cure-enhancing additives were used. The final composition consisted of the virgin fluoroelastomer gum and the recycle component and extra curatives. It employed no carrier gum or cure-enhancing additives. Test results obtained are shown in Table 2.

TABLE 2

| Ex. | Recycle Component | Carrier Gum | Cure-Enhancing Additive | | $M_L$ (dN-m) | $M_H$ (dN-m) | $t_s2$ (min) | t'50 (min) | t'90 (min) | Compression Set (%) |
| --- | --- | --- | --- | --- | --- | --- | --- | --- | --- | --- |
| | | | $C_8F_{17}SO_2NHCH_3$ | Free Radical Scavenger | | | | | | |
| C1 | No | No | No | No | 0.9 | 30.2 | 3.4 | 3.4 | 5.1 | 17.3 |
| C4 | Yes | No | No | No | 1.6 | 12.3 | 2.1 | 3.2 | 6.1 | 27.2 |
| C5 | Yes | No | No | No | 1.8 | 20.7 | 1.6 | 3.9 | 4.7 | 20.9 |
| 10 | Yes | No | Yes | No | 1.9 | 23.7 | 1.8 | 2.9 | 5.3 | 20.4 |
| 11 | Yes | No | Yes | dtbP | 1.7 | 24.4 | 1.7 | 2.6 | 4.3 | 18.5 |
| 12 | Yes | No | Yes | DBS | 1.7 | 24.6 | 1.8 | 2.4 | 3.9 | 18.7 |

The data in Table 2 show that the carrier gum is not essential to the present invention. The data further shows that the present invention provides improved final crosslinked density over that obtained with prior attempts to incorporate recycle fluoroelastomer. Finally, the data show that the present invention provides improved compression set.

Examples 13–16

These examples were prepared and tested as described in Examples 1–9 except that Fluorel FC-2179 fluoroelastomer gum was substituted for Fluorel FE-5620Q in making the recycle component and in the virgin fluoroelastomer gum. Additionally, no extra curatives and no carrier gum was used. Further, the level of cure-enhancing additive used was sufficient to provide 0.8 parts of $C_8F_{17}SO_2NHCH_3$ per hundred parts of total fluoroelastomer gum, or 0.4 parts of free radical scavenger per hundred parts of fluoroelastomer gum. The final composition comprised virgin fluoroelastomer gum composition, press-cured (i.e., partially vulcanized) recycle component, carrier gum and cure-enhancing agents. The test results are shown in Table 3.

Examples 17–18

These examples were prepared and tested as described in Examples 13–16 except that the recycle component was both press-cured and post-cured (i.e., it was essentially completely vulcanized) before being incorporated into the final composition. The results of the physical tests are given in Table 3.

Comparative Example C6

This example was prepared and tested as described in Examples C1 except that the virgin fluoroelastomer gum composition used FC-2179 instead of FE-5620Q. The results of the physical tests are given in Table 3.

Comparative Example C7

This example was prepared and tested as described in Examples 13–16 except that although the recycle component was used, no extra curative or cure-enhancing agents were employed. The results of the physical tests are given in Table 3.

Comparative Example C8

Comparative Example C7 was repeated except that the recycle component was essentially completely vulcanized before being incorporated into the final composition. The results of the physical tests are given in Table 3.

TABLE 3

| Ex. | Recycle Component | Carrier Gum | Cure-Enhancing Additive | | $M_L$ (dN-m) | $M_H$ (dN-m) | $t_s2$ (min) | t'50 (min) | t'90 (min) | Compression Set (%) |
| --- | --- | --- | --- | --- | --- | --- | --- | --- | --- | --- |
| | | | $C_8F_{17}SO_2NHCH_3$ | Free Radical Scavenger | | | | | | |
| C6 | No | No | No | No | 4.3 | 33.2 | 1.3 | 2.4 | 3.3 | 10.5 |
| C7 | Yes | No | No | No | 6.2 | 17.6 | 1.0 | 2.0 | 5.5 | 34.4 |
| C8 | Yes | No | No | No | 6.4 | 12.9 | 1.8 | 3.0 | 9.5 | 41.7 |
| 13 | Yes | No | No | DBS | 6.1 | 19.4 | 0.8 | 1.4 | 3.1 | 31.1 |
| 14 | Yes | No | No | dtbP | 6.2 | 19.4 | 0.8 | 1.4 | 3.0 | 29.1 |
| 15 | Yes | No | No | DPPD | 6.2 | 19.1 | 0.8 | 1.7 | 3.9 | 32.3 |
| 16 | Yes | No | Yes | No | 6.2 | 20.3 | 1.0 | 2.3 | 4.9 | 25.3 |
| 17 | Yes | No | No | dtbP | 6.2 | 16.7 | 1.2 | 3.5 | 9.4 | 34.6 |
| 18 | Yes | No | Yes | No | 6.1 | 14.1 | 1.5 | 3.9 | 10.2 | 31.0 |

The data in Table 3 demonstrate that incorporating a recycle component into virgin fluoroelastomer gum, even with extra curatives being present, substantially lowers the final crosslink density. It also substantially reduces the compression set resistance of the composition. Compare the $M_H$ and Compression Set values of Comparative Example C6 (virgin material) with those of Comparative Example C7.

The data further show that incorporating a cure-enhancing agent into the composition substantially improves $M_H$ and generally improves resistance to compression set over Comparative Example C7.

The data in Table 3 show improvement in both final crosslink density and resistance to compression set when the cure-enhancing agents are used to recycle at least partially vulcanized fluoroelastomer.

Finally, the data demonstrates that the benefits of the present invention are achieved even when essentially fully vulcanized recycle component is used.

Examples 19–21

Examples 19–21 were prepared and tested as described in Examples 1–9 except that the amount of the carrier/recycle blend combined with the virgin fluoroelastomer gum was adjusted so that the recycle component comprised 10%, 20% or 30% of the total composition. Additionally, the carrier gum contained dichlorodiphenylsulfone (DCDPS) in an amount sufficient to provide 0.9 parts of DCDPS per 100 parts of fluoroelastomer gum. The test results are listed in Table 4.

TABLE 4

| Ex. | Recycle Component | Carrier Gum | Cure-enhancing Additive $C_8F_{17}SO_2NHCH_3$ | Free Radical Scavenger | $M_L$ (dN-m) | $M_H$ (dN-m) | $t_s2$ (min) | t'50 (min) | t'90 (min) | Compression Set (%) |
|---|---|---|---|---|---|---|---|---|---|---|
| C1 | No | No | No | No | 0.9 | 30.2 | 3.4 | 3.4 | 5.1 | 17.3 |
| C2 | Yes (22.5%) | Yes | No | No | 1.7 | 13.9 | 2.5 | 3.1 | 5.4 | 25.6 |
| C3 | Yes (22.5%) | Yes | No | No | 1.6 | 21.8 | 2.1 | 3.8 | 6.2 | 23.1 |
| 19 | Yes (10%) | Yes | Yes | DBS/DPPD | 1.2 | 27.0 | 2.9 | 3.9 | 6.3 | 16.2 |
| 20 | Yes (20%) | Yes | Yes | DBS/DPPD | 1.7 | 26.7 | 2.6 | 3.9 | 5.9 | 19.9 |
| 21 | Yes (30%) | Yes | Yes | DBS/DPPD | 2.4 | 27.4 | 2.0 | 3.4 | 5.9 | 21.9 |

The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A curable elastomer composition consisting essentially of:
   (a) a recycle component of an at least partially vulcanized fluorinated elastomer; and optionally, an unvulcanized fluoroelastomer gum, and
   (b) an amount of a cure-enhancing additive system that is effective to improve the maximum torque during cure of a composition according to this claim over the maximum torque during cure of a similar composition that does not have the additive system, the additive system consisting essentially of
      (i) a cure enhancing additive selected from the group consisting of a fluoroaliphatic sulfonamide, a free radical scavenger, and a mixture of the two,
      (ii) optionally a crosslinking agent for a fluoroelastomer gum, and,
      (iii) optionally an accelerator.

2. The composition according to claim 1 wherein the the recycle component is the at least partially vulcanized fluoroelastomer.

3. The composition according to claim 1 wherein the recycle component is a mixture of the unvulcanized fluorinated elastomer gum, and the at least partially vulcanized fluoroelastomer.

4. The composition according to claim 1 wherein the cure-enhancing additive system includes the crosslinking agent.

5. The composition according to claim 1 wherein the cure-enhancing additive system includes the accelerator.

6. The composition according to claim 1 further consisting essentially of a processing aid.

7. The composition according to claim 1 wherein
   (a) the cure-enhancing additive is a mixture of a fluoroaliphatic sulfonamide and a free radical scavenger;
   (b) the crosslinking agent is selected from the group consisting of organic peroxides, inorganic peroxides, polyhydroxy compounds, organic polyamines, fluoroaliphatic polyols, allyl ethers of polyhydroxy compounds, and allyl carbonates of polyhydroxy compounds; and
   (c) the accelerator consists essentially of an organo-onium compound.

8. The composition according to claim 7 wherein the cure-enhancing additive is a free radical scavenger selected from the group consisting of phenol compounds, phosphite compounds, thioester compounds, and amine compounds.

9. A composition useful to recycle cured fluoroelastomer materials consisting essentially of:
   (a) a recycle component comprising an at least partially vulcanized fluoroelastomer,
   (b) an amount of an additive system that is effective to improve the maximum torque during cure of a composition according to this claim over the maximum torque during cure of a similar composition that does not contain the additive system, the additive system consisting essentially of
      (i) a cure-enhancing additive selected from the group consisting of fluoroaliphatic sulfonamide, a free radical scavenger, and a mixture of the two,
      (ii) a curative for a fluoroelastomer gum, and
      (iii) an organo-onium accelerator.

10. A composition according to claim 9 further consisting essentially of a virgin fluoroelastomer gum.

11. An article comprising the crosslinked composition of claim 9.

12. A method of recycling an at least partially vulcanized fluorinated elastomer consisting essentially of the steps of:
   (a) providing a quantity of an at least partially vulcanized fluorinated elastomer; and an additive system comprising essentially of
      (i) at least one cure-enhancing additive selected from the group consisting of a fluoroaliphatic sulfonamide, a free radical scavenger, and a mixture of the two,
      (ii) at least one curative, and,
      (iii) optionally at least one accelerator,
   (b) refining the at least partially vulcanized fluoroelastomer by mixing under conditions which break the crosslinks and reduce the molecular weight in order to form a continuous mass, (c) blending the additive system with the at least partially vulcanized fluoroelastomer, optionally while the at least partially vulcanized fluoroelastomer is being refined, and (d) curing the resulting composition.

13. A method according to claim 12 wherein refining the at least partially vulcanized fluoroelastomer occurs in the presence of a virgin fluoroelastomer gum.

14. A curable fluoroelastomer composition consisting of:
(a) a virgin fluoroelastomer gum, and
(b) an amount of a cure-enhancing additive system that is effective to improve the maximum torque during cure of a composition according to this claim over the maximum torque during cure of a similar composition that does not contain the additive system, the additive system consisting essentially of
  (i) a cure-enhancing additive selected from the group consisting of a fluoroaliphatic sulfonamide, a free radical scavenger, and a mixture of the two,
  (ii) a curative, and
  (iii) an accelerator, and
(c) a recycle component of an at least partially vulcanized fluorinated elastomer.

15. A curable composition useful in recycling at least partially cured fluoroelastomer materials into uncured fluoroelastomer materials consisting essentially of:
(a) a recycle component of an at least partially vulcanized fluoroelastomer, and, optionally an unvulcanized fluoroelastomer gum,
(b) from 1 to 1000 millimoles of a cure-enhancing additive system per 100 parts of the recycle component wherein the cure-enhancing additive system consists essentially of
  (i) a cure-enhancing additive selected from the group consisting of a fluoroaliphatic sulfonamide, a free radical scavenger, and a mixture of the two,
  (ii) optionally a crosslinking agent for a fluoroelastomer gum, and,
  (iii) optionally an accelerator.

16. The composition according to claim 15 wherein the cure-enhancing additive system consists essentially of from about
(a) 1 to 45 weight percent of the cure-enhancing additive,
(b) 1 to 75 weight percent of the crosslinking agent, and
(c) 1 to 40 weight percent of the accelerator.

17. The composition according to claim 15 wherein the cure-enhancing additive consists essentially of $C_8F_{17}SO_2NHCH_3$.

18. The composition according to claim 15 wherein the crosslinking agent consists essentially of HO—∅—C(CF$_3$)$_2$—∅—OH (Bisphenol AF).

19. The composition according to claim 15 wherein the accelerator consists essentially of the reaction product of equimolar quantities of triphenyl benzyl phosphonium chloride and the sodium salt of HO—∅—C(CF$_3$)$_2$—∅—OH (Bisphenol AF).

20. A curable composition useful in recycling cured fluoroelastomer materials consisting of:
(a) an unvulcanized fluoroelastomer gum,
(b) an at least partially vulcanized fluorinated elastomer, and
(c) an additive system that consists essentially of
  (i) at least one cure-enhancing additive selected from the group consisting of a fluoroaliphatic sulfonamide, a free radical scavenger, and a mixture of the two
  (ii) at least one curative, and,
  (iii) optionally at least one accelerator.

21. A curable fluoroelastomer composition useful in recycling cured fluoroelastomer materials comprising:
(a) an at least partially vulcanized fluorinated elastomer, and
(b) optionally an unvulcanized fluoroelastomer gum, and
(c) an additive system that consists essentially of
  (i) at least one cure-enhancing additive, and selected from the group consisting of a fluoroaliphatic sulfonamide, a free radical scavenger, and a mixture of the two
  (ii) optionally at least one curative, and,
  (iii) optionally at least one accelerator
wherein after curing, the fluoroelastomer composition has improved compression set as compared to similar fluoroelastomer composition that does not contain the additive system.

* * * * *

UNITED STATES PATENT AND TRADEMARK OFFICE
CERTIFICATE OF CORRECTION

PATENT NO. : 6,087,406
DATED : July 11, 2000
INVENTOR(S) : Allan T. Worm, Erik D. Hare, Paul N. Nelson It is certified that error appears in the above-identified patent and that said Letters Patent is hereby corrected as shown below:

Col. 22, Claim 12, lines 56-57, "comprising essentially of" should be -- consisting essentially of --.

Signed and Sealed this

Twenty-fourth Day of April, 2001

*Attest:*

NICHOLAS P. GODICI

*Attesting Officer*      *Acting Director of the United States Patent and Trademark Office*